Patented Feb. 23, 1932

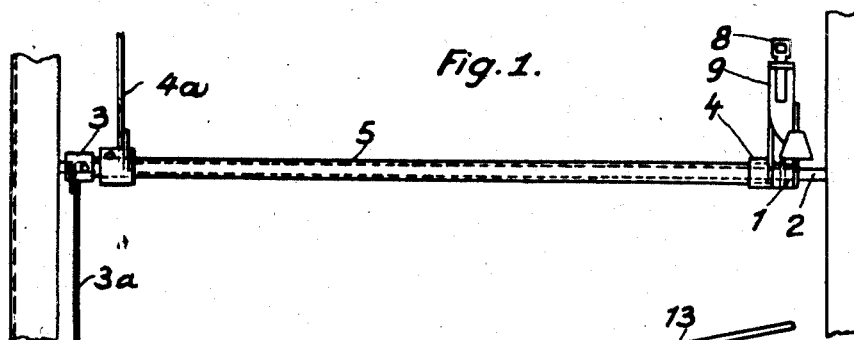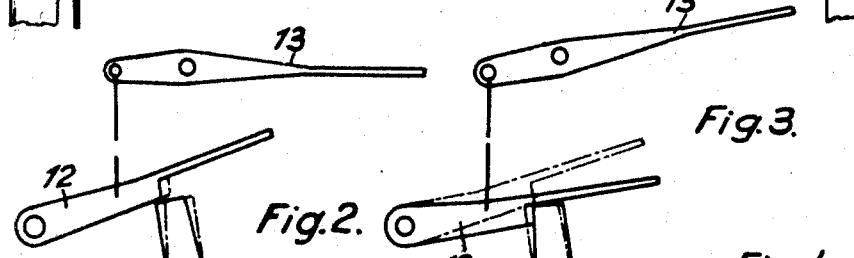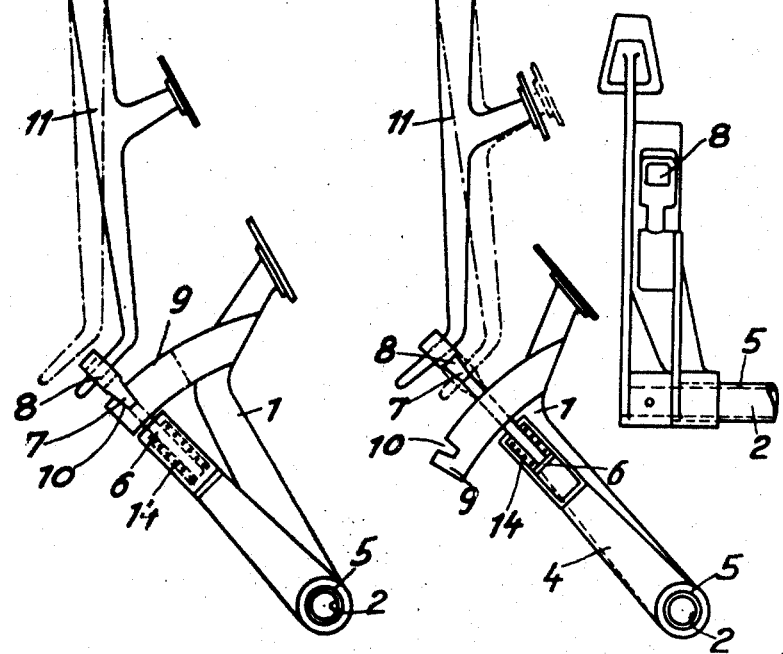

1,846,332

UNITED STATES PATENT OFFICE

GUIDO HORN, OF BERLIN-WEISSENSEE, GERMANY

BRAKE FOR VEHICLES

Application filed December 5, 1927, Serial No. 237,764, and in Germany December 22, 1926.

This invention is concerned with improvements in front and rear wheel brakes and has as its object to prevent accidents and particularly the overturning of automobiles fitted with such brakes.

The front wheels of motor vehicles have the function of leading the vehicle in the direction steered in. This impairs the function of the brakes so that when the latter are applied the vehicle is not always entirely under the proper control of the driver. This invention is further concerned with the elimination or reduction of this danger.

In normal condition the use of the front and rear wheel brakes is not dangerous, below medium driving speeds however, the danger increases not only with the speed but also with the depth to which the wheels penetrate into the road surface. The danger of overturning moreover is increased when the front and rear wheel brakes are used in a curve or at the same time as a turn is made.

The front and rear wheel brakes are important for rapid braking in town traffic but for cross-country journeys such rapid braking is scarcely necessary and should therefore be avoided for fast driving.

Vehicles fitted, for instance, with four-wheel brakes generally present the possibility of braking the rear wheels only by using the hand brake; from habit, however, of any braking suddenly becoming necessary, the foot brake is usually first operated, that is the brake which as a rule acts on all four wheels.

The object of the present invention is to construct or arrange the four-wheel-brakes in such a manner that the braking action on the front wheels may be cut out when desired. As a rule this will be the case as soon as the speed which is without danger for the use of the four wheel brakes is exceded.

Proposals have been made to interpose a coupling which is releasable at will between the front wheel and rear wheel brakes. These known arrangements have the drawback that the coupling is normally thrown-in. To avoid accidents, however, the coupling must, on the occurrence of dangerous conditions mentioned above, be rapidly released. In the moment of danger further presence of mind is, therefore, necessary on the part of the driver in that he must disconnect the front wheel brakes in time. There is thus the danger of accidents of the nature set forth in spite of the provision for disconnecting the front wheel brakes.

According to the present invention absolute safety is created by reason of the fact that the connection is normally inoperative although in a condition of readiness which enables the driver, at will, to recouple the front wheel brakes with the rear wheel brakes at any time. With this arrangement the driver automatically brakes with the rear wheel brakes only while he is in a position at any moment to call upon the front wheel brakes when the driving conditions appear to make it desirable.

The constructional form of the operative parts employed in any particular application of this invention will depend upon the particular construction of the front and rear wheel brakes in question. The rendering operative and inoperative of the brake actuating gear of the front wheels may be effected by hand or foot as desired. When, therefore, a free stretch is driven over at high speed with the front wheel brakes inoperative, the latter may still be rendered operative when, by braking of the rear wheels only, the speed has already been reduced so far that the use of the both brakes has become harmless.

The invention may be applied to existing constructions of front and rear wheel brakes or to existing four wheel brake gear without interfering with the arrangement or manner of operation thereof.

Some embodiments of the invention are illustrated by way of example in the accompanying drawings in which:

Fig. 1 is a more or less diagrammatic plan of the pedal shaft of a motor vehicle, the levers, usual for the clutch and acceleration being omitted.

Fig. 2 is a side elevation showing the brake lever arrangement with the brakes coupled.

Fig. 3 is a similar view with the brakes uncoupled, and

Fig. 4, a front elevation thereof.

Referring to the drawings, in which similar reference characters denote similar parts, it will be seen that the pedal shaft 2 is rotated by a pedal lever 1 and converts the rotary movement of the latter into the corresponding pull on the brakes. A lever 3 located near one end of the shaft 2 is fixed to the latter and intended to act through a rod 3a in the usual manner upon the rear wheels. A lever 4 is connected to a tube or hollow shaft 5 which can rotate freely on the brake shaft 2, the levers 4ª which transmit the braking section to the front wheels being connected to said tube or hollow shaft 5. Depending upon the construction of the particular type of front wheel brakes the rotary movement of the tube 5 may be utilized in various ways for braking purposes. It is also a matter of indifference whether the front wheels are directly braked immediately from the tube 5 or whether the latter acts primarily upon an intermediate shaft, as is usual for the operation of the rear wheel brakes.

The lever 4 is provided with a pawl or detent 6 having a locking tooth 7 and an eyelet 8. A sector 9 with a notch 10 for engagement with said pawl tooth 7 is mounted on the pedal lever 1.

A releasing lever 11 for uncoupling the front wheel brakes is arranged in an appropriate position above the pedal lever and its lower end engages in the eyelet 8 in the pawl 6 when the pedal lever is in its position of rest (Fig. 2). The movement of the lever 11 is limited in the direction towards the driver and said lever is provided with a surface for foot operation. If it is depressed into the position shown in Fig. 3 the pawl 6 and the locking tooth 7 will be raised and lifted out of the notch 10 in the sector 9. A locking lever 12 prevents the release lever 11 returning to its previous position before it is lifted by foot or by operation of a hand lever 13.

When the lever 11 has been pressed back and the pawl 6 raised (Fig. 3), the pedal lever and the front wheel brakes will be disconnected from each other and only the harmless braking of the rear wheels can occur.

Even in this position the uncoupled front wheel brakes may be brought into a condition in which they are ready for re-coupling (as shown with a chain line in Fig. 3). For this purpose the lever 11 is freed by depressing the hand lever 13 or raising the locking lever 12 by foot, whereupon said lever 11 is pressed back by its spring (not shown) and allows the pawl 6 to descend. The gear for transmitting the front wheel braking action is thus brought into a "ready" position, the pawl 6 being depressed by the spring 14 and the locking tooth 7 sliding on the sector 9 until the pedal lever has been allowed to return completely and said tooth 7 can snap into the notch 10.

If therefore it is necessary to brake at full speed it is possible to release the pawl 6 very rapidly by releasing the locking lever 12 by a light blow on the hand lever 13, without thereby engaging the front wheel brakes. Said front wheel brakes are, rather, merely in a ready position and may be coupled at will with the rear wheel brakes when the pedal lever has been allowed to return fully to its forward position. So long as the braking is on the back wheels only, the foot is not taken so far back that the tooth 7 can slip into the notch 10; thus premature undesired actuation of the front wheel brakes is not to be feared. For this, further retraction of the foot is necessary.

The accompanying drawings show arrangements in which the disengagement of the front wheel brakes is effected by means of a foot movement.

Now the coupling device must be designed for any particular vehicle model in a more or less obvious manner which, as has been stated, will depend upon the particular arrangement of the brakes.

I claim:

1. In a front and rear wheel brake mechanism for vehicles, the combination of an actuating lever for the front wheel brake, an actuating lever for the rear wheel brake, a releasable clutch provided intermediate said actuating levers, an additional lever adapted to engage and disengage said clutch, and a locking lever associated with said additional lever.

2. A front and rear wheel brake mechanism as specified by claim 1, in which the clutch comprises a tooth which may be moved by the additional lever to come out of engagement with said actuating levers, thus disengaging the clutch between the front wheel and rear wheel brakes, the locking lever being composed of a plurality of members adapted to retain and release the additional lever and the locking lever in disengaged and engaged condition of the clutch respectively.

3. A front and rear wheel brake mechanism as specified by claim 1, in which the clutch comprises a tooth which may be moved by the additional lever to come out of engagement with said actuating levers, thus disengaging the clutch between the front wheel and rear wheel brakes, the locking lever being composed of a plurality of members adapted to retain and release the additional lever and the locking lever in disengaged and engaged condition of the clutch respectively, said clutch being adapted to be thrown-in in fully released condition of the rear wheel brake.

In testimony whereof I affix my signature.

GUIDO HORN.